Patented July 16, 1940

2,208,355

UNITED STATES PATENT OFFICE 2,208,355

PROCESS FOR PRODUCING OXY-CARBOXYLIC ACID ESTERS

Ludwig Beer and Paul Halbig, Munich, Germany, assignors to Consortium Fur Elektrochemische Industrie, G. m. b. H., Munich, Germany, a corporation of Germany No Drawing. Application January 13, 1939, Serial No. 250,754. In Germany January 21, 1938

7 Claims. (Cl. 260—484)

This invention relates to the production of oxy-carboxylic acid esters and has for its object to provide a simple and efficient process for this purpose.

In the condensation of formic acid esters with carboxylic acid esters of the general formula RCH$_2$COOR', where R represents a hydrogen atom, an alkyl or alkoxy group and COOR' represents an ester group, condensation products are obtained which are considered as alkali salts of oxy-methylene compounds. The free compounds, it is true, may be liberated from the alkali salts by acidification, but in the free state they are very unstable, as is known, and they are therefore hardly capable of being isolated.

We have found that these unstable compounds may be reduced by catalysis with hydrogen to the corresponding saturated oxy-carboxylic acid esters. For this purpose we do not attempt to prepare the unstable compound in a pure state but proceed with the hydrogenation of the dilute mass which is obtained in the manufacture of the compound itself. The reduction occurs with hydrogen in liquid phase, for instance with nickel as a catalyst. In certain cases the reduction may also be effected in the vapor phase with the usual catalysts. Certain of the hydrogenation products are valuable solvent and softening agents, and others are easily convertible by the splitting off of water into vinyl compounds (acrylic ester and the like) which may be converted into resins, oils, rubber-like masses, etc. by polymerisation.

Example 1

20 parts of sodium-formyl-acetic ester, obtained by condensation of formic acid ester with acetic ester, are dissolved in 200 parts of 40%-strength methanol, acidified while cooling with the calculated quantity of dilute sulphuric acid, and distilled at 3 mm. pressure from a water bath of 40° C., whereby the formyl acetic ester distills over with water vapor. The distillate is agitated after addition of a nickel catalyst at 30 atmospheres hydrogen pressure at room temperature, until no further hydrogen absorption takes place. After the separation of the catalyst by vacuum distillation the pure hydracrylic acid ethyl ester is isolated. Boiling point (10 mm.) =74–75° C.; B. P. (710 mm.) =184° C.; D$_2^{20}$=1.073; contents determined by saponification: 99.8%.

Example 2

The reaction mixture obtained in the condensation of methyl formate and propionic acid methyl ester, containing 256 parts of sodium salt of the formyl-propionic acid methyl ester, is acidified with dilute sulphuric acid, the layer of ester is separated and removed by a counter-current of steam. The surplus formic acid ester is distilled off and the water containing propionic acid ester and formyl propionic acid ester mixture, containing 216 parts of the latter is hydrogenated after the addition of 5 parts of nickel catalyst at 70° C. under 45 atmospheres of hydrogen pressure. The hydrogenation is completed in two to three hours. It is separated from the catalyst and the solvent distilled off under atmospheric pressure. The colorless residue is fractionated under reduced pressure. Yield 200 parts pure α-methyl-hydracrylic acid-methyl ester=91.8% of the theoretical yield. B. P. (10 mm.) =71–72° C.; D$_4^{20}$=1.064.

Example 3

The condensation product of ethyl formate and propionic acid ethyl ester is worked up as in Example 2. Yield from 287 parts formyl-propionic acid ethyl ester is 267 parts of pure α-methyl-hydracrylic acid-ethyl ester=92% yield. B. P. (9 mm.) =78° C.; D$_{20}^{20}$=1.018.

Example 4

The condensation product obtained from methyl formate and butyric acid methyl ester, containing 524 parts of sodium formyl butyric acid methyl ester is acidified with the calculated quantity of dilute sulphuric acid and the separated raw ester layer is distilled by a counter-current of steam and liberated from the surplus formic acid ester. The ester water mixture is mixed with so much methanol that a clear solution is obtained and, upon addition of 5 parts of nickel catalyst is hydrogenated under 40 atmospheres pressure at 60° C. Upon separation of the catalyst the solvent is distilled off and the ester fractionated in vacuum. Yield 403 parts of α-ethyl hydracrylic acid-methyl ester=88.6% yield. B. P. (10 mm.) =84° C.; D$_4^{20}$=1.031.

Example 5

50 parts of sodium salt of α-methoxy-β-oxy-acrylic acid-methyl ester, obtained by condensation of methyl formate and methoxy acetic acid-methyl ester are mixed with sufficient cooling and stirring with 2 N-sulphuric acid to a weak Congo acid reaction, and the clear solution is hydrogenated upon addition of 2 parts of nickel catalyst at 50° C. under 40 atmospheres of pressure until no further carbonyl groups appear. It is then boiled down in vacuum, the residue is extracted, if necessary, with acetic ester and the ester is fractionated in vacuum. Yield 30.5 parts of pure α-methoxy-hydracrylic acid-methyl ester=72% of theory. B. P. (10 mm.)=95° C.; $D_4^{20}$=1.158.

Example 6

200 parts of α-ethoxy-β-oxy-acrylic acid-ethyl ester, obtained by acidification of the condensation product generated in the condensation of ethyl formate and ethoxy-acetic acid ethyl ester, are mixed with 100 parts of ethanol upon dissociation or separation of the aqueous layer and distillation off of the surplus formic acid ester and is hydrogenated upon addition of 5 parts of nickel catalyst under a pressure of 40 atmospheres at 60° C. The solvent is distilled off and the hydrogenation products fractionated in vacuum. Yield 192 parts α-ethoxy-hydracrylic acid-ethyl ester=94.8% of the theoretical yield. B. P. (10 mm.)=99–101° C.; $D_4^{20}$=1.060.

Example 7

The condensation product of butyl formate and butoxy-acetic acid-butyl ester, consisting of 140 parts of α-butoxy-β-oxy-acrylic acid-butyl ester in the form of the sodium enolate and surplus formic acid ester, is stirred a while with 500 parts of water, whereby a part of the formic acid ester is saponified and liberated from the sodium salt of the formyl-butoxy-acetic ester. Butanol and butyl formate are driven off with water vapor or steam, the residual ester layer is separated and upon addition of 100 parts of alcohol and 2 parts of nickel catalyst it is hydrogenated at 50° C. at a pressure of 40 atmospheres. Upon completion of the hydrogenation it is separated from the catalyst and the solvent distilled off. The hydrogenation product is fractionated in vacuum. Yield=127 parts of pure α-butoxy-hydracrylic acid-butyl ester=90% of theory. B. P. (1 mm.)= 105–106° C.; B. P. (712 mm.)=258° C.;

$$D_4^{20}=0.984$$

The invention claimed is:

1. Process for producing oxy-carboxylic acid esters which comprises reducing the free condensation product of a formic acid ester and a carboxylic acid ester of the general formula RCH$_2$COOR′, where R is a member selected from the group consisting of a hydrogen atom, an alkyl and an alkoxy group and COOR′ is an ester group.

2. Process for producing oxy-carboxylic acid esters which comprises condensing a formic acid ester with a carboxylic acid ester of the general formula RCH$_2$COOR′, where R is a member selected from the group consisting of a hydrogen atom, an alkyl and an alkoxy group and COOR′ is an ester group, and hydrogenating the free condensation product.

3. Process for producing oxy-carboxylic acid esters which comprises condensing a formic acid ester with a carboxylic acid ester of the general formula RCH$_2$COOR′ where R is a member selected from the group consisting of a hydrogen atom, an alkyl and an alkoxy group and COOR′ is an ester group, and hydrogenating the free condensation product in the presence of a hydrogenation catalyst.

4. Process for producing oxy-carboxylic acid esters which comprises hydrogenating a formyl acetic acid ester in the presence of a hydrogenation catalyst.

5. Process for producing oxy-carboxylic acid esters which comprises hydrogenating a formyl propionic acid ester in the presence of a hydrogenation catalyst.

6. Process for producing oxy-carboxylic acid esters which comprises hydrogenating an α-alkoxy-β-oxy-acrylic ester in the presence of a hydrogenation catalyst.

7. Process for producing oxy-carboxylic acid esters which comprises condensing a formic acid ester with an acetic acid ester, treating the condensation product with an acid to obtain the formyl acetic ester, and hydrogenating said last mentioned ester in the presence of a hydrogenation catalyst.

LUDWIG BEER.
PAUL HALBIG.